United States Patent Office 2,839,577
Patented June 17, 1958

2,839,577

PROCESS FOR THE PREPARATION OF THE OPTI-
CALLY ACTIVE FORMS OF THREO-1-(P-NITRO-
PHENYL)-2-AMINO-1:3-DIHYDROXYPROPANE

János Kollonitsch, Budapest, and Oszkár Fuchs, Duna-
keszi, Hungary, assignors to Chinoin Gyogyszer-és
Vegyészeti Termékek Gyara Részvénytársaság, Buda-
pest, Hungary No Drawing. Application June 21, 1955
Serial No. 517,066

Claims priority, application Hungary June 29, 1954

6 Claims. (Cl. 260—570.6)

This invention relates to the preparation of the opti-
cally active forms of threo-1-(p-nitrophenyl)-2-amino-1:3-
dihydroxypropane by reducing the optically active form
of threo-2-(p-nitrophenyl)-serine or esters thereof.

The main object of the present invention is to prepare
such compounds in a simple manner, whereby also a good
yield is obtained.

By the reduction of an optically active form of com-
pounds very often a racemisation occurs and, in general,
it cannot be predicted whether the new compound formed
by the reduction possesses the same rotatory power as
the starting material.

It has been found that with the above mentioned com-
pounds racemisation does not take place if alkali earth
borohydrides are employed as reducing agents.

According to the invention the optically active forms
of threo-1-(p-nitrophenyl)-2-amino-1:3-dihydroxypropane
is obtained by reducing an optically active form of threo-
2-(p-nitrophenyl)-serine or esters thereof with an alkaline
earth metal borohydride, i. e. calcium, strontium or
barium borohydride.

Employing D(—)-threo-2-(p-nitrophenyl)-serine or
esters thereof D(—)-threo-1-(p-nitrophenyl)-2-amino-
1:3-dihydroxypropane is obtained without racemisation.
The N-acyl as well as the N-dichloracetyl derivatives of
the p-nitrophenyl serine can be reduced with an excellent
yield by means of alkaline earth borohydrides, especially
calcium borohydride. Employing D(—)-N-dichlor-
acetyl-(p-nitrophenyl)-serine or esters thereof D(—)-1-
(p-nitrophenyl)-2-dichloracetyl-1:3-dihydroxypropane is
obtained.

The alkyl ether of the optically active form of threo-
2-(p-nitrophenyl)-serine or esters thereof can also be
used as starting material and in this case the alkyl radical
is split off after the reduction.

The reduction may be carried out in any convenient
solvent, e. g. hydroxyl-free media, such as ether or tetra-
hydrofurane, as the borohydrides are liable to decom-
pose in hydroxylic media, particularly at higher tempera-
tures. At lower temperatures, hydroxylic solvents, such
as ethanol, can however also be used. The reduction is
preferably carried out at a temperature in the range of
from —10° to +80° C., although in hydroxylic media it
may be advantageous to work at lower temperatures, for
example at a temperature between —10 and —50° C.

Instead of using alkaline earth metal borohydrides, the
serine compounds may be subjected to the action of a
mixture of a complex metal borohydride, the metal com-
ponent of which is not an alkaline earth metal, such as an
alkali metal borohydride and an alkaline earth metal
salt. We have found, for example, that a mixture of an
alkaline earth metal iodide or bromide with sodium or
potassium borohydride is an effective reducing agent.
Such a mixture of an alkaline earth metal salt and an
alkali metal borohydride can also be used in hydroxylic
media. While we do not wish to be limited by theoreti-
cal considerations, it seems probable that where a mixture
of a complex metal borohydride, such as an alkali metal
borohydride, and an alkaline earth metal salt is used as
the reducing agent, an alkaline earth metal borohydride
is formed in situ and then reacts with the carboxylic acid
or esters thereof.

In order that the invention may be well understood
the following examples are given by way of illustration
only:

*Example 1*

1.11 anhydrous calcium chloride is dissolved in 32 ml.
absolute ethanol. The solution is cooled to —20° C.
and mixed with a solution of 0.76 g. sodium borohydride
in 48 ml. absolute ethanol. The mixture is stirred for
15 minutes in a moisture sealed vessel whereafter 5.08 g.
of finely pulverized D(—)-threo-2-(p-nitrophenyl)-serine
ethyl ester are added to it. The white dilute suspension
is stirred for 5½ hours at —20° C., then left to stand for
half an hour at —15° C. and for a further hour at —10°
C. and the mixture is then left to stand overnight at
—6° C.

N-hydrochloric acid is then added until the pH is
lowered to 4, for which purpose about 15 ml. of the acid
are required. The mixture is then evaporated to dryness.
8.5 g. of a white crystalline substance is obtained. This
substance is dissolved in 40 ml. water, shaken with 3×10
ml. diethyl ether, the aqueous layer made alkaline to
phenolphthalein with 5 N-NaOH, the solution freed from
the precipitated calcium hydroxide by means of centri-
fuging and 2.4 g. benzaldehyde are then added to the
liquid. After shaking for some time a crystalline sub-
stance is precipitated which, after cooling with ice water
for 1 hour, is filtered off with suction, washed with water
and dried in vacuo. The benzal compound of D(—)-
threo-1-(p-nitrophenyl)-2-amino-1:3-dihydroxy propane is
obtained, M. P. 147–148°, yield about 90%.

By boiling said benzal compound with aqueous or alco-
holic hydrochloric acid, D(—)-threo-1-(p-nitrophenyl)-
2-amino-1:3-dihydroxy propane hydrochloride is obtained
in theoretical yield. The aminodiol can be liberated from
this compound in known manner.

The reaction product can also be separated as follows:
the aqueous alkaline solution freed from calcium ions is
repeatedly shaken with methyl ethyl ketone or with ethyl
acetate, the united extracts dried over magnesium sul-
phate and concentrated. If desired, the D(—)-1-(p-nitro-
phenyl)-2-amino-1:3-dihydroxy propane obtained can be
purified by recrystallisation from an aqueous solution
thereof.

*Example 2*

4.80 g. D(—)-threo-2-(p-nitrophenyl)-serine methyl
ester is used as starting material and is treated as de-
scribed in Example 1. Yield as in Example 1.

What we claim is:

1. Process for the preparation of optically active forms
of threo-1-(p-nitrophenyl)-2-amino-1:3-dihydroxy pro-
pane comprising mixing an optically active form of a
lower alkyl ester of threo-2-(p-nitrophenyl)-serine with
an alkaline earth metal borohydride in a medium selected
from the group consisting of ether and tetrahydrofurane
at temperatures of —10° to +80° C. and a short-chain
alkanol at temperatures between —10° and —50° C. to
effect a reaction between the same whereby the threo-2-
(p-nitrophenyl)-serine ester is reduced.

2. Process for the preparation of the optically active
forms of threo-1-(p-nitrophenyl)-2-amino-1:3-dihydroxy
propane comprising mixing a lower alkyl ester of the op-
tically active form of threo-2-(p-nitrophenyl)-serine with
an alkaline earth metal borohydride in a short-chain alkanol medium at a temperature in the range of from —10° to —50° C.

3. Process for the preparation of the optically active forms of threo-1-(p-nitrophenyl)-2-amino-1:3-dihydroxy propane comprising mixing a lower alkyl ester of D(—)-threo-2-(p-nitrophenyl)-serine and a lower alkyl alcohol with calcium borohydride at a temperature in the range of from —10° to —50° C.

4. Process for the preparation of optically active forms of threo-1-(p-nitrophenyl)-2-amino-1:3-dihydroxy propane comprising mixing an optically active form of the methyl ester of threo-2-(p-nitrophenyl)-serine with an alkaline earth metal borohydride in a short-chain alkanol medium at a temperature between —10° and —50° C. for several hours and maintaining the mixture under quiescent conditions for a period of time several times the mixing time to reduce the ester.

5. Process for the preparation of optically active forms of threo-1-(p-nitrophenyl)-2-amino-1:3-dihydroxy propane comprising mixing an optically active form of the ethyl ester of threo-2-(p-nitrophenyl)-serine with an alkaline earth metal borohydride in a short-chain alkanol medium at a temperature between —10° to —50° C. for several hours and maintaining the mixture under quiescent conditions for a period of time several times the mixing time to reduce the ester.

6. Process for the preparation of optically active forms of threo-1-(p-nitrophenyl)-2-amino-1:3-dihydroxy propane comprising dissolving anhydrous calcium chloride in a short-chain alkanol medium, cooling the solution to a temperature between —10° and —50° C., mixing the solution with a solution of sodium borohydride in a short-chain alkanol medium, mixing with the mixed solutions a lower alkyl ester of the optically active form of threo-2-(p-nitrophenyl)-serine, stirring the mixture and maintaining the same quiescent for an extended period of time to reduce the ester.

References Cited in the file of this patent

FOREIGN PATENTS

| 500,594 | Belgium | Jan. 31, 1951 |
| 506,331 | Belgium | Oct. 31, 1951 |

OTHER REFERENCES

Carrara et al.: "J. Am. Chem. Soc.," vol. 74 (1952), p. 4949.